(12) United States Patent
Reis et al.

(10) Patent No.: US 6,835,262 B1
(45) Date of Patent: Dec. 28, 2004

(54) POSITIVE PRESSURE HOT BONDER

(75) Inventors: Carl Reis, Torrance, CA (US); Thomas Ambrose, Los Angeles, CA (US); Chandrakant Shah, Burbank, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 22 days.

(21) Appl. No.: 10/465,319

(22) Filed: Jun. 19, 2003

(51) Int. Cl.[7] .......................... B32B 5/02; B32B 15/00; B32B 31/20; B32B 35/00
(52) U.S. Cl. ........................ 156/94; 156/228; 156/285; 156/358; 156/581; 156/583.8; 100/38; 100/92; 100/211; 100/233; 100/268; 100/296.04
(58) Field of Search ............................. 100/258 A, 264, 100/268, 269.01, 269.04, 269.12, 269.17, 269.2, 38, 92, 302, 320, 315–317, 211, 214, 226–229, 231, 233, 229 R, 234, 258 R, 257; 156/71, 94, 228, 285, 312, 358, 359, 381, 382, 389, 580, 581, 583.1, 583.6, 583.8

(56) References Cited

U.S. PATENT DOCUMENTS

| | | |
|---|---|---|
| 2,725,091 A | 11/1955 | Miner et al. |
| 3,661,683 A | 5/1972 | Engel et al. |
| 3,837,965 A | 10/1972 | Mahon et al. |
| 3,996,091 A | 12/1976 | Daunt et al. |
| 5,374,388 A | 12/1994 | Frailey |
| 5,442,156 A | 8/1995 | Westerman et al. |
| 5,492,466 A | 2/1996 | Frailey |
| 5,657,972 A | 8/1997 | Blatt |
| 5,728,258 A | 3/1998 | Chung |
| 5,975,183 A | 11/1999 | Reis et al. |

Primary Examiner—Chris Fiorilla
Assistant Examiner—Sing P. Chan
(74) Attorney, Agent, or Firm—Stetina Brunda Garred & Brucker

(57) ABSTRACT

There is provided a pressure bonding system for applying pressure onto at least one tile of a workpiece. This system comprises upper and lower gripper members each having first and second gripper ends. The second gripper ends are connected to each other. The first gripper ends are movable relative to each other to receive the workpiece therebetween. Moreover, an upper pressure applicator assembly is slidably engaged to the upper gripper member. The upper pressure applicator assembly is slidable along the upper gripper member between the first and second ends along a length of the workpiece. The workpiece is placed between the upper and lower gripper members with an edge thereof being adjacent the second gripper ends. The upper pressure applicator applies pressure to the tile(s) upon relative movement of the first ends towards the workpiece to a position adjacent the tile(s).

7 Claims, 3 Drawing Sheets

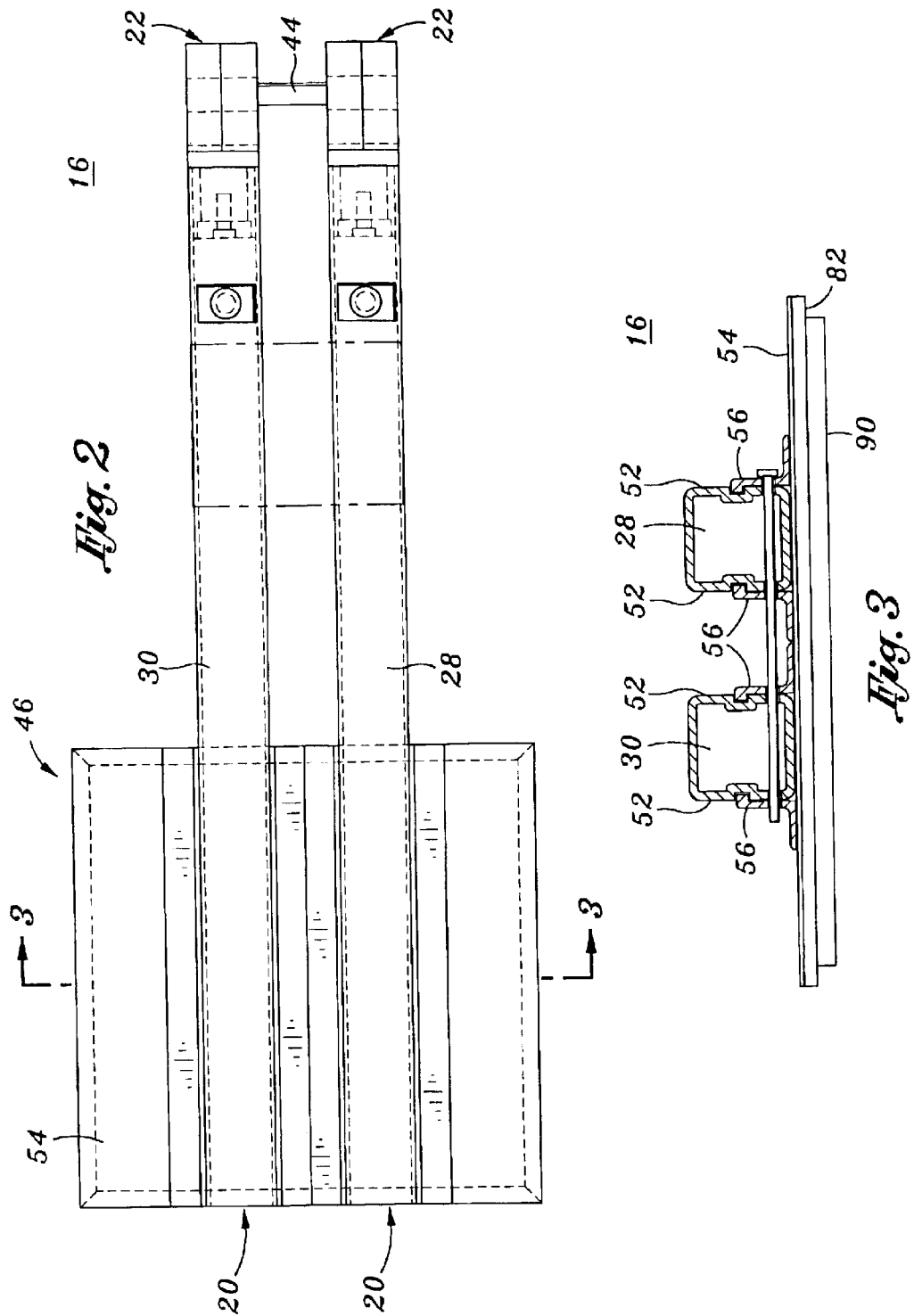

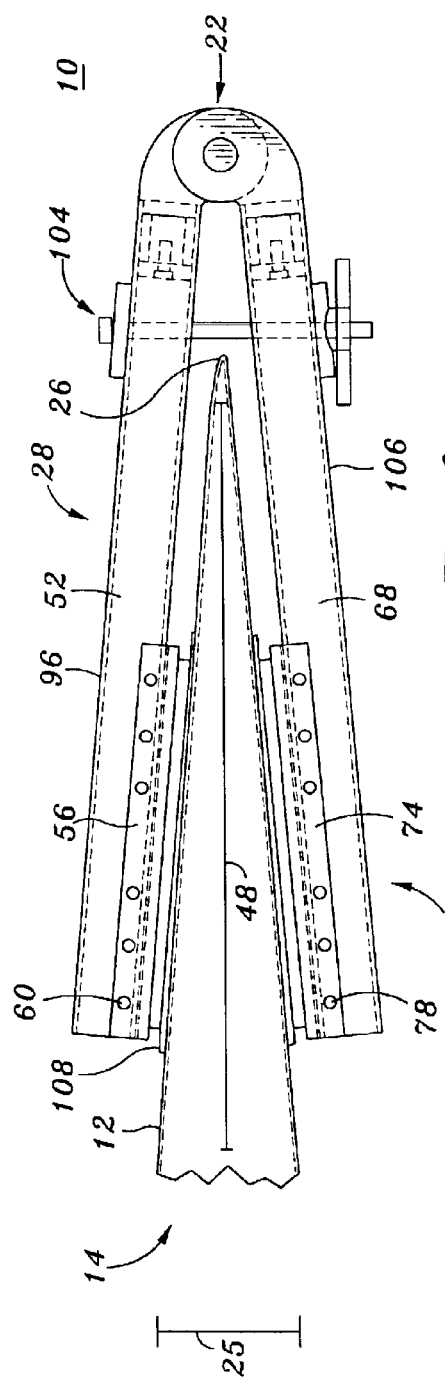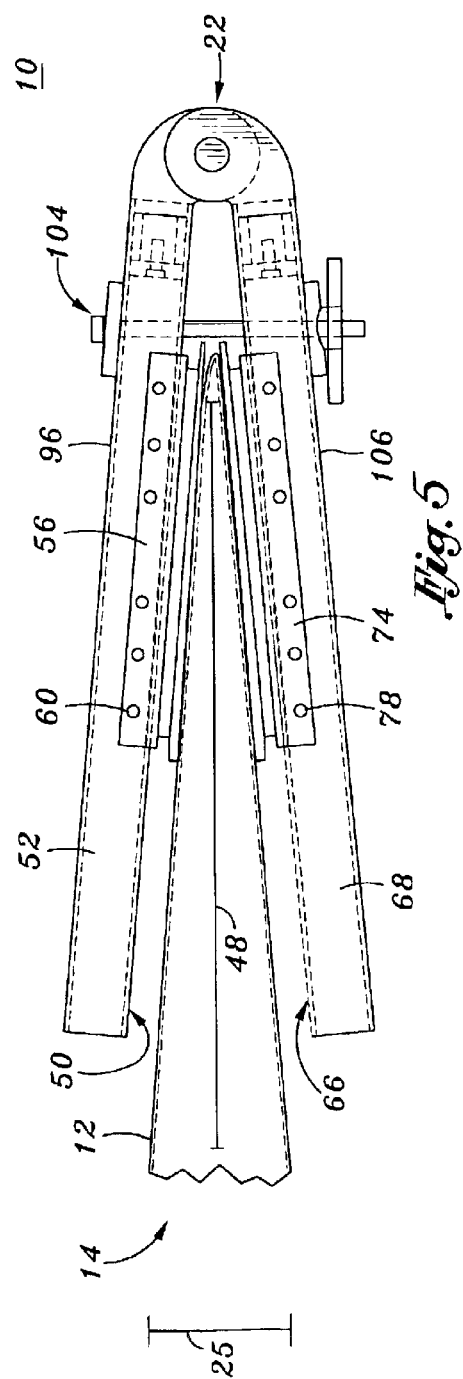

POSITIVE PRESSURE HOT BONDER

STATEMENT RE: FEDERALLY SPONSORED RESEARCH/DEVELOPMENT

This invention was made with Government support under contract F33657-87C-2000 awarded by the United States Government. The Government has certain rights in this invention.

CROSS-REFERENCE TO RELATED APPLICATIONS

Not Applicable

BACKGROUND OF THE INVENTION

The present invention generally relates to bonding systems, and more particularly to an improved bonding system having pressure applicators which transition to and position the repaired/replaced tiles therebetween so that positive and counteracting pressures may be applied to the tiles for proper adhesion.

The outer skins of modern day aircrafts and spacecrafts are typically formed by high-temperature ceramic tiles to protect their underlying structural and electrical parts. By utilizing these tiles, the airplanes and spacecrafts remain quite safe and operable as external elements such as rocks or birds are substantially prevented from damaging their internal parts. However, though such ceramic tiles may achieve their primary objective of protecting the underlying parts, they possess certain deficiencies which detract from their overall utility.

Perhaps the greatest deficiency of the high-temperature ceramic tiles is their susceptibility to impacts caused by the external elements. Such impacts oftentimes result in dents and/or cracks on the outer structural integrity of the aircrafts and spacecrafts. These dents and/or cracks are not only aesthetically unpleasing, but may further lead to undesirable operational characteristics such as reduced aerodynamic characteristics.

Obviously, the marring leading to these structural and operational deficiencies are unacceptable on multi-million dollar aircrafts and spacecrafts. In order to cure such deficiencies, the aircrafts and spacecrafts frequently have to be subjected to multi-step repair procedures. First, the damaged ceramic tiles are taken out as they must be replaced with new ones. Then, the impacted region(s) must be thoroughly cleaned of all dirts and debris. Thereafter, new ceramic tiles are bonded to the impacted region(s) typically with high-temperature silicone adhesives. As is commonly known in the aerospace industry, silicon adhesives require optimal heat and pressure to ensure proper adhesion.

In this respect, especially when the replaced tiles are considerable, the bonded ceramic tiles are typically subjected to vacuum bagging. However, due to tile butt joints and porosity of tiles, such vacuum bagging must extend beyond the replaced tile area. This defined bagging procedure is typically complex, and susceptible to human error if not carefully and meticulously attended to. Furthermore, the vacuum bagging is typically time-consuming, as this procedure may take 8 to 48 hours to accomplish. With the addition of other procedures as mentioned above, the time to repair an aircraft may be extensive, with the greater repair time comes the increased labor costs that the aerospace manufacturing companies must bear.

Thus, there has long been a need in the industry, and in the aerospace industry in particular, for a bonding system which would improve the procedure associated with adhering the replacement ceramic tiles onto aircraft and spacecraft in a more time-efficient and cost-effective manner. Further, there is a need to properly install these ceramic tiles by utilizing a systematic approach to more consistently yield optimal adhesion of the tiles.

The present invention addresses and overcomes the above-described deficiencies of prior art bonding systems by providing an improved bonding system that utilizes its pressure applicators to apply both positive and counteracting pressures upon the repaired/replaced ceramic tiles. More specifically, the pressure applicators themselves transition to the tiles while the tiles are stationed within the bonding system and heated via a removable heating element, so as to conveniently provide both pressure and heat necessary for proper adhesion. In this respect, not only does the present invention mitigate the need to resort to inefficient and costly bond procedures, but it also improves the adhesion that is often required in such procedures.

BRIEF SUMMARY OF THE INVENTION

In accordance with a preferred embodiment of the present invention, there is provided a pressure bonding system for applying pressure onto at least one tile of a workpiece. This system comprises upper and lower gripper members each having first and second gripper ends. The second gripper ends are connected to each other. Further, the first gripper ends are movable relative to each other to receive the workpiece therebetween. Moreover, an upper pressure applicator assembly may be slidably engaged to the upper gripper member. The upper pressure applicator assembly may be slidable along the upper gripper member between the first and second ends along a length of the workpiece. The workpiece may be placed between the upper and lower gripper members with an edge thereof being adjacent the second gripper ends. The upper pressure applicator may apply pressure to the tile(s) upon relative movement of the first ends towards the workpiece to a position adjacent the tile(s).

The upper and lower gripper members may be fabricated from any metallic material. However, aluminum is preferred. Due to the hinged connection of the second gripper ends, the first ends may be movable away from each other to provide an opening which is generally greater than a thickness of the workpiece between the upper and lower gripper members. Preferably, the tile(s) used is ceramic tile(s) which may be bonded to the workpiece such as an aerodynamic structure. An exemplary aerodynamic structure would be a wing of an aircraft.

In accordance with the present invention, a heating element may be disposed between the upper pressure applicator assembly and the tile(s). This heating element is laid over and provides heat to the tile(s) while it is being pressurized. In the preferred embodiment, the heating element used for this purpose is a heat blanket.

The upper gripper member comprises inward and outward gripper surfaces, as well as an exterior side gripper surface forming a channel substantially between the first and second gripper ends. Adjacent to this channel are a series of gripper holes. The upper pressure applicator assembly has a first upper surface which is disposed adjacent the inward gripper surface and which is slidable relative thereto. The first upper surface preferably includes an upper connection bracket that may be slidably engaged to the channel formed along the exterior side gripper surface. This connection bracket has a series of upper connection holes which may be aligned with the gripper holes. When the holes are aligned, a pin may be inserted collectively therethrough to prevent the upper connection bracket, and thus the upper pressure applicator assembly, from further sliding along the channel. Preferably, the upper pressure applicator is a platen having a generally rectangular configuration.

In the present invention, the upper pressure applicator assembly comprises a second upper surface having an upper pressure applicator for applying pressure to the tile(s). More particularly, the second upper surface defines an upper recess in which the upper pressure applicator is disposed therewithin. In one preferred embodiment, the upper pressure applicator may simply be a rubber pad. In the other preferred embodiment, it is a bladder which may be inflated and deflated to apply variable pressure to the tile(s).

In accordance with a preferred embodiment of the present invention, the lower gripper member comprises a lower pressure applicator assembly which is slidably engaged thereto. This assembly is used for counteracting the pressure applied by the upper pressure applicator assembly. Similar to the upper gripper member, the lower gripper member has inward and outward gripper surfaces. It further has an exterior side gripper surface that defines a channel substantially between the first and second gripper ends. A series of gripper holes are formed adjacent to this channel. In the preferred embodiment, the lower pressure applicator assembly is a platen with a generally rectangular configuration.

Furthermore, the lower pressure applicator assembly includes a first lower surface disposed adjacent the inward gripper surface. The first lower surface may be sized and configured to be slidable relative to the inward gripper surface. More particularly, the first lower surface may include a lower connection bracket which may be slidably engaged to the channel formed along the lower gripper member's exterior side gripper surface. The lower connection bracket defines a series of lower connection holes that may be aligned with the gripper holes whereat a pin may be inserted collectively therethrough. The insertion of the pin in this manner stations the lower connection bracket, and thus the lower pressure applicator assembly, in place.

In addition, the lower pressure applicator assembly may include a second lower surface which has a lower pressure applicator. The lower pressure applicator is utilized for counteracting the pressure applied by the upper pressure applicator assembly. In particular, the second lower surface has a lower recess placing the lower pressure applicator therewithin. Like the upper pressure applicator, the lower pressure applicator may be a rubber pad or an inflatable/deflatable bladder configured to apply variable counteracting pressure.

In accordance with the present invention, a gripper member retaining mechanism may be operatively engaged to upper and lower gripper members to maintain the gripper members in pressure bearing relation to the tile(s). This retaining mechanism is sized to tightly retain the workpiece between the upper and lower gripper members. Although the gripper member retaining mechanism is preferably a manually tightenable clamp, other devices operative to generate compressing force are contemplated. Specifically, the retaining mechanism may be extended between the outward gripper surfaces of the upper and lower gripper members.

In one preferred embodiment of the present invention, the upper gripper member is comprised of first and second elongated upper arms, whereas the lower gripper member is comprised of first and second elongated lower arms. Adjacent or at the second gripper ends, the upper arms each have an upper flange portion and the lower arms each have a lower flange portion. The flange portions of the first upper and lower arms may be generally extended toward and engaged to each other. Likewise, the flange portions of the second upper and lower arms may be generally extended toward and engaged to each other.

More specifically, the upper flange portions may each have an upper aperture and the lower flange portions may each have a lower aperture. In this regard, the lower flange portions may be disposed between the upper flange portions in a manner as to align the lower apertures with the upper apertures. Thereafter, a pivot pin may be inserted through the upper and lower apertures and be secured therewithin so that a hinged connection may be formed thereat.

BRIEF DESCRIPTION OF THE DRAWINGS

These as well as other features of the present invention will become more apparent upon reference to the drawings wherein:

FIG. 2 is a top view of the upper gripper member of FIG. 1 and illustrating an upper pressure applicator assembly which is slidably engaged between the first and second gripper ends thereof;

FIG. 3 is a cross-sectional view of the upper gripper member of FIG. 1 and illustrating its channel which slidably engages the upper pressure applicator assembly thereto;

FIG. 4 is a side view of the pressure bonding system of FIG. 1 and illustrating upper and lower pressure applicator assemblies which are positioned adjacent its first gripper ends; and FIG. 5 is a side view of the pressure bonding system of FIG. 1 and illustrating upper and lower pressure applicator assemblies which are positioned adjacent its second gripper ends.

DETAILED DESCRIPTION OF THE INVENTION

Figure 1:
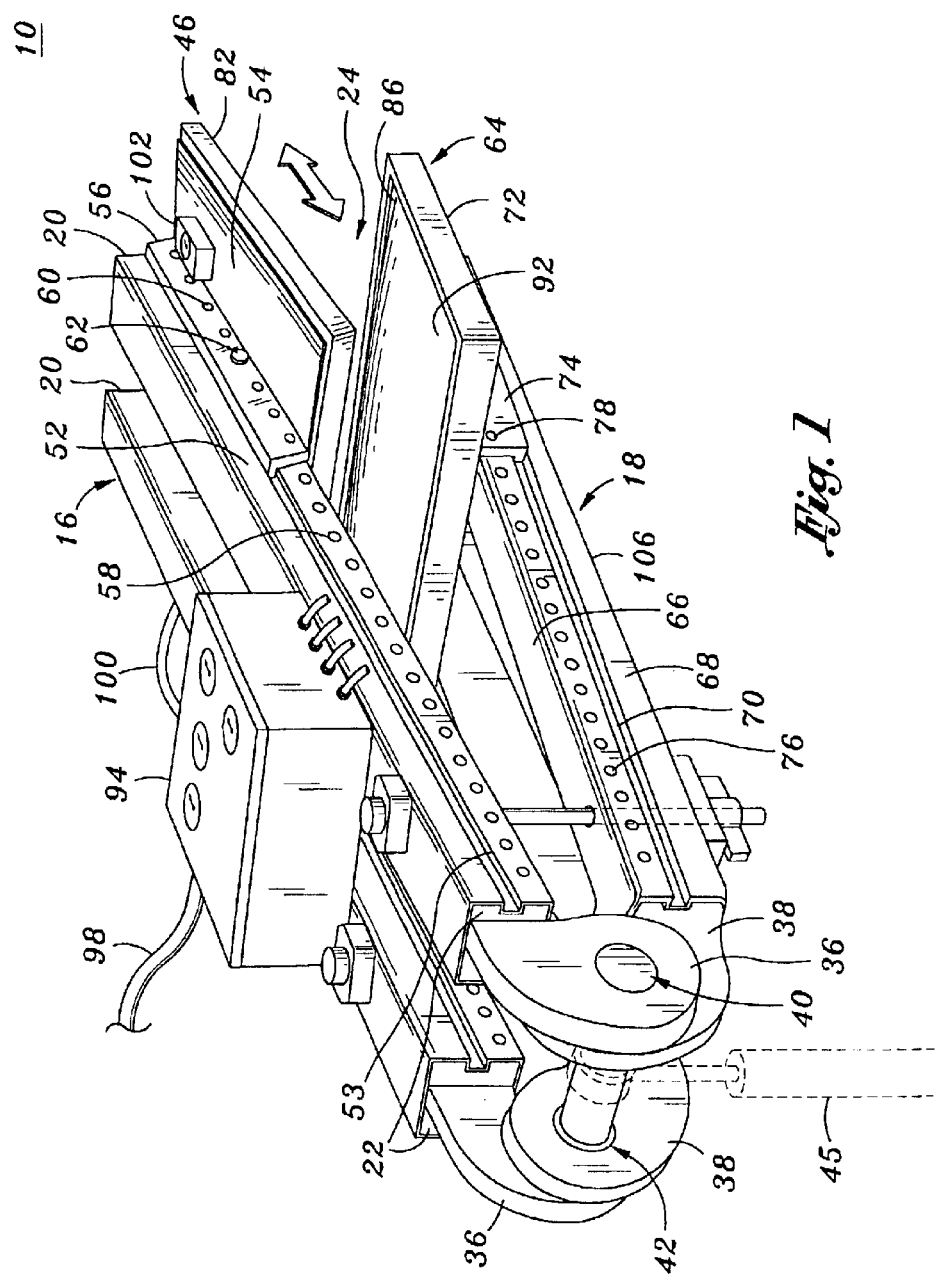
FIG. 1 is a perspective view of a pressure bonding system utilized for applying pressure onto tiles constructed in accordance with a preferred embodiment of the present invention and illustrating its upper and lower gripper members.

Referring now to the drawings wherein the showings are for purposes of illustrating preferred embodiments of the present invention only, and not for purposes of limiting the same, FIG. 1 perspectively illustrates a pressure bonding system 10 constructed in accordance with a preferred embodiment of the present invention. The pressure bonding system 10 is adapted to apply pressure onto at least one tile 12 of a workpiece 14. In this regard, the pressure bonding system 10 may be formed to have a variety of shapes, configurations, geometries and textures other than for that shown in FIGS. 1–5. Such bonding system 10 may be fabricated from any material such as metal, hard plastic, hard rubber, or wood.

Referring more particularly to FIGS. 1, 4 and 5, as the pressure bonding system 10 may be any general desired shape, it is understood that the pressure bonding system 10 as depicted is symbolic in nature. However, the pressure bonding system 10 is comprised of an upper gripper member 16 and a lower gripper member 18 each having a first gripper end 20 and a second gripper end 22. The upper and lower gripper members 16, 18 may be fabricated from any material. However, it is expressly stated herein that such members 16, 18 are preferably fabricated from a metallic material. More preferably, aluminum is used to fabricate the upper and lower gripper members 16, 18.

The first ends 20 may transition toward and away from each other to provide a plurality of differently sized openings 24 between the upper and lower gripper members 16, 18. Although such openings 20 may vary, it is anticipated that the opening 20 would generally be greater than a thickness 25 of the workpiece 14 when operational so that the workpiece 14 can be conveniently placed between the upper and lower gripper members 16, 18. As will be demonstrated below, the second gripper ends 22 are preferably connected together in a hinged fashion in order to transition the first ends 20 with respect to each other. The workpiece 14 may be disposed in any manner pursuant to technician's needs and specifications. However, it is preferred that an edge 26 of the workpiece 14 is adjacent the second gripper ends 22 when ready to apply pressure to the tile(s) 12.

Referring now to FIGS. 1 and 2, the upper gripper member 16 is formed of a first elongated upper arm 28 and a second elongated upper arm 30. Likewise, the lower gripper member 18 is formed of a first elongated lower arm 32 and a second elongated lower arm 34. The first and second upper arms 28, 30 each define an upper flange portion 36 formed adjacent the second gripper end 22, whereas the first and second lower arms 32, 34 each define a lower flange portion 38 also formed adjacent the second gripper end 22. Each of the upper flange portions 36 has an upper aperture 40 and each of the lower flange portions 38 has a lower aperture 42.

In this regard, the upper flange portion 36 of the first upper arm 28 is generally extended toward the lower flange portion 38 of the first lower arm 32. Furthermore, the upper flange portion 36 of the second upper arm 30 is also generally extended toward the lower flange portion 38 of the second lower arm 34. Upon forming this relationship, the lower flange portions 38 are disposed between the upper flange portions 36. However, a person of ordinary skill in the art will recognize that such specific configuration is not mandatory, but merely preferred.

The upper and lower apertures 40, 42 are aligned with each other. Thereafter, a rod-like structure 44 which is sufficiently lengthened to pass through the upper and lower apertures 40, 42 may be inserted through the same 40, 42 and be secured therewithin to provide the hinged connection thereat. An exemplary rod-like structure 44 would be a pivot pin and the like. Lastly, a raising mechanism 45 such as a hydraulic piston (best shown in FIG. 1 in dotted lines) may be attached to the rod-like structure 44 in order to raise and lower the pressure bonding system 10 as a whole to the workpiece 14.

Moreover, there is provided an upper pressure applicator assembly 46 which is slidably engaged to both the first and second upper arms 28, 30. The upper pressure applicator assembly 46 may be used to apply pressure to the tile(s) 12 upon relative movement of the first gripper ends 20 towards the workpiece 14. As will be described shortly, this applicator assembly 46 is configured to be slidably movable between the first and second gripper ends 20, 22 of the upper arms 28, 30. More specifically, the upper pressure applicator assembly 46 may be moved along a length 48 of the workpiece 14 placed between the upper arms 28, 30 and lower arms 32, 34. Before proceeding to the specificity of how the upper pressure applicator 46 is slidably engaged, it is important to state that the tile(s) 12 as defined herein is ceramic tile(s). However, it is also contemplated herein that other types of tiles 12 may be substituted in lieu thereof. Additionally, the workpiece 14 as described herein may be any aerodynamic structure such as an aircraft's wing or a trailing edge thereof.

As illustrated in FIGS. 1 and 3–5, each of the upper arms 28, 30 have an inward gripper surface 50 and an exterior side gripper surface 52. The exterior side gripper surfaces 52 each have a channel 53 which is defined substantially therealong between the first and second gripper ends 20, 22. Further, the upper pressure applicator assembly 46 comprises a first upper surface 54. With these surfaces 50, 52, 54 now defined, it should be noted that the first upper surface 54 is preferably disposed adjacent the inward gripper surface 50 so as to be slidable with respect thereto.

More particularly, the first upper surface 54 of the upper pressure applicator assembly 46 may include an upper connection mechanism 56 which may be slidably engaged to the channel 53 of the exterior side gripper surface 52. A type of upper connection mechanism 56 that may be used for this purpose is a L-shaped connection bracket but other types capable of making similar connections may be used. Through such engagement, the upper pressure applicator assembly 46 may slidably move and be stationed in position by any known or conventional method. However, the preferred method is that the exterior side gripper surface 52 comprises a series of gripper holes 58 extending beneath and generally parallel to the channel 53. As the upper connection mechanism 56 may comprise a series of upper connection holes 60, the gripper holes 58 and upper connection holes 60 may be aligned with each other when the upper pressure applicator assembly 46 needs to be stationed. Thereafter, a pin 62 for example may be inserted collectively therethrough to prevent the upper connection mechanism 56 from further sliding along the channel 53.

Likewise, a lower pressure applicator assembly 64 may be slidably engaged to both the first and second lower arms 32, 34. The lower pressure applicator assembly 46 may be utilized to counteract the pressure applied by the upper pressure applicator assembly 46. It should be noted that providing this applicator assembly 64 is optional as the lower arms 32, 34 may simply yield any planar surface opposite to the upper pressure applicator assembly 46 to generally oppose its applied pressure. However, the lower applicator assembly 64 is preferably incorporated into the pressure bonding system 10 so that a counteracting pressure may be generated in response to the applied pressure to increase the pressurization of the tile(s) 12 upon the workpiece 14. This aspect of the invention will be soon be illustrated.

Similar to the upper assembly 46, the lower pressure applicator assembly 64 is also configured to slidably move between the first and second gripper ends 20, 22 of the lower arms 32, 34. This applicator assembly 64 may move by itself, or concurrently with the upper pressure applicator assembly 46 along the length 48 of the workpiece 14 disposed therebetween. Likewise, each of the lower arms 32, 34 have an inward gripper surface 66 and an exterior side gripper surface 68. The exterior side gripper surfaces 68 of the lower arms 32, 34 each include a channel 70 formed substantially therealong between the first and second gripper ends 20, 22. Moreover, the lower pressure applicator assembly 64 further has a first lower surface 72. The first lower surface 72 is preferably disposed adjacent the inward gripper surface 66 in a manner as to be slidable relative thereto.

In particular, the first lower surface 72 of the lower pressure applicator assembly 64 may comprise a lower connection mechanism 74 similar or identical to the upper connection mechanism 56. This lower mechanism 74 is preferably a L-shaped connection bracket which may be slidably engaged to the lower channel 70. However, other similar kinds of connection mechanisms may be used. The lower arms 32, 34 may also have a series of gripper holes 76 on each of their exterior side gripper surfaces 68 which may be aligned with respective lower connection holes 78 of the lower connection mechanism 74. By inserting a pin 80 for example through these aligned holes 76, 78, the lower connection mechanism 74 may be prevented from further sliding along the lower channel 70.

Referring now to FIGS. 1, 4 and 5, the upper and lower pressure applicator assemblies 46, 64 are preferably moved by hand. However, slideability of the assemblies 46, 64 via electronic means is contemplated herein. In addition, the upper and lower assemblies 46, 64 may each be formed as platens having a generally rectangular configuration. However, it is not necessary that such assemblies 46, 64 be platens or have this specific configuration. The upper and lower assemblies 46, 64 may be made from any material. But, metal is preferred, and even more preferably, aluminum. The upper pressure applicator assembly 46 comprises a second upper surface 82 with an upper recess 84, whereas the lower pressure applicator assembly 64 comprises a second lower surface 86 with a lower recess 88.

Respectively disposed within the upper recess 84 and lower recess 88 are an upper pressure applicator 90 and a lower pressure applicator 92. Essentially, the upper and lower pressure applicators 90, 92 may be adhesively or fastenably engaged within their respective recesses 84, 88. The upper pressure applicator 90 may be utilized to apply pressure upon the tile(s) 12, wherein the lower pressure applicator 92 may be used to apply counteracting pressure upon the opposite side of thereof. The upper and lower pressure applicators 90, 92 may each be a rubber pad sized and configured to apply the respective pressures via relative movement of the first gripper ends 20 towards the workpiece 14.

Alternatively, the upper and lower pressure applicators 90, 92 may each be a bladder which can be selectively inflated and deflated so as to apply variable pressure and counteracting pressure upon the tile(s) 12. The bladders may be fabricated from any expandable elastomeric material. These bladders may be filled up to an optimal amount (e.g., 7 pounds of pressure) with any fluids such as air or water, but air is preferred. It is recognized herein that the bladders may be filled by direct attachment of a pump for example, or by a control unit box 94 which is placed upon an outward gripper surface 96 of the upper arms 28, 30. In this respect, the control unit box 94 is attached to shop air to derive air therefrom (via an air connecting hose 98 shown in FIG. 1) and further deliver this air to the bladders (via a bladder connecting hose 100 shown in FIG. 1).

The control unit box 94 is operative to monitor and apply fluid pressure within the inflatable/deflatable bladders. As such, as shown in FIG. 1, this box 94 comprises various pressure and vacuum gauges thereupon to facilitate the accomplishment of its operations. However, separate pressure gauges 102 may be placed upon the assemblies 46, 64 themselves to determine the actual pressure levels within the bladders. Moreover, the upper and lower assemblies 46, 64 may even have pressure relief valves (not shown) for releasing over-pressurized air and/or gated valves for ensuring optimal pressure levels within the bladders.

Referring particularly to FIGS. 4 and 5, a gripper member tightener 104 may be extended between the upper arms 28, 30 and lower arms 32, 34 in a generally perpendicular relationship to the length 48 of the workpiece 14. More specifically, the tightener 104 is extended between the outward gripper surface 96 of the upper arms 28, 30 and the outward gripper surface 106 of the lower arms 32, 34. By such extension, the gripper member tightener 104 may tightly retain the workpiece 14 between the upper arms 28, 30 and the lower arms 32, 34. Although various types of tighteners may be used for this purpose, it is preferred that a manually tightenable clamp is utilized.

When applying pressures upon the tile(s) 12 of the workpiece 14, it is recommended a heating element 108 is placed between the upper pressure applicator 90 and the targeted tile(s) 12. By doing so, both pressure and heat are applied to the workpiece 14 to thereby ensure optimal adhering of the tile(s) 12 thereto. However, it is expressly contemplated herein that such heating element 108 may not be necessary as hot air may be provided to the tile(s) 12 from a pore or pores (not shown) formed through the upper pressure applicator 90. Although various heating elements may be used, it is preferred that high-temperature heat blanket is utilized for this purpose.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A method of bonding at least one ceramic tile onto an aerodynamic structure having an edge and a length with a pressure bonding system, the system including upper and lower gripper members each having a second gripper end movably connected to each other, the method comprising the steps of:

a) placing the aerodynamic structure having the ceramic tile(s) thereon between the upper and lower gripper members with the edge thereof being adjacent the movably connected second gripper ends;

b) laying a heating element over the ceramic tile(s) for applying heat thereto;

c) sliding an upper pressure applicator assembly relative to the second gripper ends to the ceramic tile(s) along the length of the aerodynamic structure;

d) sliding a lower pressure applicator assembly relative to the second gripper ends along the length of the aerodynamic structure to dispose the ceramic tile(s) between the upper and lower applicator assemblies;

e) moving first ends of the upper and lower gripper members to a position adjacent the aerodynamic structure;

f) applying pressure to the ceramic tile(s) with the upper pressure applicator assembly; and g) counteracting the applied pressure with the lower pressure applicator assembly.

2. The method of claim 1 wherein step a) comprises:

1) moving the first gripper ends of the upper and lower gripper members away from each other to form an opening generally greater than the thickness of the aerodynamic structure; and 2) inserting the aerodynamic structure through the opening formed by the first gripper ends.

3. The method of claim 1 wherein the heating element in step b) is a heat blanket.

4. The method of claim 1 wherein step c) comprises:
1) sliding the upper pressure applicator assembly between the first and second ends of the upper gripper member towards the ceramic tile(s); and
2) stationing the upper pressure applicator assembly when positioned generally above the ceramic tile(s).

5. The method of claim 1 wherein step d) comprises:
1) sliding the lower pressure applicator assembly between the first and second ends of the lower gripper member towards the ceramic tile(s); and
2) stationing the lower pressure applicator assembly when the ceramic tile(s) is disposed between the upper and lower applicator assemblies.

6. The method of claim 1 wherein steps f) and g) comprise:
1) defining an upper pressure applicator of the upper pressure applicator assembly and a lower pressure applicator of the lower pressure applicator assembly;
2) applying pressure to the ceramic tile(s) with the upper pressure applicator; and
3) counteracting the applied pressure with the lower pressure applicator.

7. The method of 6 wherein the upper and lower pressure applicators are inflatable/deflatable bladders for applying variable pressure and counteracting pressure.

* * * * *